United States Patent
Gerken et al.

(10) Patent No.: US 8,056,051 B2
(45) Date of Patent: *Nov. 8, 2011

(54) CREATING APPLICATION CONTENT USING AN OPEN MODEL DRIVEN ARCHITECTURE

(75) Inventors: Christopher Henry Gerken, Austin, TX (US); Geoffrey Martin Hambrick, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 869 days.

This patent is subject to a terminal disclaimer.

(21) Appl. No.: 12/107,436

(22) Filed: Apr. 22, 2008

(65) Prior Publication Data
US 2008/0196003 A1   Aug. 14, 2008

Related U.S. Application Data

(63) Continuation of application No. 10/904,107, filed on Oct. 22, 2004, now Pat. No. 7,376,933.

(51) Int. Cl.
*G06F 9/44* (2006.01)
*G06F 9/45* (2006.01)
(52) U.S. Cl. ......... 717/106; 717/112; 717/114; 717/116
(58) Field of Classification Search ........... 717/106–119
See application file for complete search history.

(56) References Cited

U.S. PATENT DOCUMENTS

| | | | |
|---|---|---|---|
| 5,974,252 A * | 10/1999 | Lin et al. | 717/108 |
| 6,199,195 B1 | 3/2001 | Goodwin et al. | |
| 6,253,367 B1 * | 6/2001 | Tran et al. | 717/108 |
| 6,665,685 B1 | 12/2003 | Bialic | |
| 6,701,517 B1 | 3/2004 | Moore et al. | |
| 6,775,680 B2 | 8/2004 | Ehrman et al. | |
| 6,981,212 B1 | 12/2005 | Claussen et al. | |
| 7,120,897 B2 * | 10/2006 | Ebbo et al. | 717/108 |
| 2003/0023413 A1 | 1/2003 | Srinivasa | |
| 2003/0074648 A1 * | 4/2003 | Brassard et al. | 717/104 |
| 2003/0106042 A1 | 6/2003 | Lynch et al. | |
| 2003/0134677 A1 | 7/2003 | Obied et al. | |
| 2003/0192027 A1 | 10/2003 | Porter | |
| 2003/0212904 A1 | 11/2003 | Randle et al. | |

(Continued)

FOREIGN PATENT DOCUMENTS
WO    WO 03/038682    5/2003

OTHER PUBLICATIONS

B Kogut et al.; Open-Source Software Development and Distributed Innovation; Oxford Review of Economic Policy, 2001—Oxford Univ Press; pp. 1-41.*

(Continued)

*Primary Examiner* — Wei Zhen
*Assistant Examiner* — Satish Rampuria
(74) *Attorney, Agent, or Firm* — Matthew B. Talpis; Gregory K. Goshorn; Greg Goshorn, P.C.

(57) ABSTRACT

A system for generating application content includes specifying an application definition or model in a flexible grammar, defining a set of templates that define generalized content output forms, and specifying a control definition for transforming the application definition into application content bused on the templates. A transformation engine accesses the application definition and performs output generation under the control of the control description.

2 Claims, 3 Drawing Sheets

U.S. PATENT DOCUMENTS

| | | | |
|---|---|---|---|
| 2003/0233365 A1 | 12/2003 | Schmit et al. | |
| 2004/0002883 A1 | 1/2004 | Andrews et al. | |
| 2004/0034846 A1 | 2/2004 | Ortal et al. | |
| 2004/0107124 A1 | 6/2004 | Sharpe et al. | |
| 2004/0107125 A1 | 6/2004 | Guheen et al. | |
| 2004/0111702 A1* | 6/2004 | Chan | 717/113 |
| 2004/0268303 A1* | 12/2004 | Abe et al. | 717/108 |
| 2005/0155016 A1* | 7/2005 | Bender | 717/106 |
| 2005/0223355 A1* | 10/2005 | Forstmann et al. | 717/115 |
| 2005/0262481 A1* | 11/2005 | Coulson | 717/120 |
| 2006/0048096 A1* | 3/2006 | Jiang et al. | 717/115 |
| 2006/0156278 A1* | 7/2006 | Reager | 717/104 |
| 2007/0089103 A1 | 4/2007 | Iborra et al. | |

OTHER PUBLICATIONS

G Von Krogh et al., Community, joining, and specialization in open source software innovation: a case study; aquired from http://citeseerx.ist.psu.edu/viewdoc/download?doi=10.1.1.12.4701&rep=rep1&type=pdf; Research Policy, 2003—Elsevier; pp. 1-51.*

Singh, A.; Schaeffer, J.; Green, M., A template-based approach to the generation of distributed applications using a network of workstations, Transactions on Parallel and Distributed Systems, vol. 2 Issue: 1 Jan. 1991, IEEE, pp. 52-67.*

Taguchi, M.; Suzuki, T.; Tokuda, T., A visual approach for generating server page type Web applications based on template method, Human Centric Computing Languages and Environments, 2003. Proceedings. 2003 IEEE Symposium on, Oct. 2003, IEEE, pp. 248-250.*

Rodriguez et al.; IBM Redbook: IBM WebSphere Portal V4 Developer's Handbook; Mar. 2003; IBM.

Singh et al.;"A Template-Based Approach to the Generation of Distributed Applications Using a Network of Workstations"; Transactions on Parallel and Distributed Systems, V. 2, Issue 1; Jan. 1991; IEEE, pp. 52-67.

Taguchi et al.; "A Visual Approach for Generating Server Page Type Web Applications Based on Template Method;" 2003 IEEE Symposium on Human Centric Computing Languages and Environments, 2003. pp. 248-250.

Helman et al.; "Application Generator Based on Parameterized Templates"; 26th International Conference on Information Technology Interfaces; Jun. 2004, V. 1; pp. 151-157.

Sluiman et al.; "Round Tripping Generated Text Based Files"; IBMTDBS#AAA00A060457; RD n435 Jul. 2000 Article 173, p. 310.

Spring et al.; "Round Trip Maintenance of Software Configuration"; IBM DOSS #AUS920010702.

* cited by examiner

CREATING APPLICATION CONTENT USING AN OPEN MODEL DRIVEN ARCHITECTURE

CROSS-REFERENCE TO RELATED APPLICATIONS

The present application is a continuation of an application entitled "System and Method for Creating Application Content Using an Open Model Driven Architecture," Ser. No. 10/904,107, now U.S. Pat. No. 7,376,933, filed Oct. 22, 2004, assigned to the assignee of the present application, and herein incorporated by reference.

BACKGROUND

1. Technical Field

The present invention relates to data processing systems. In particular, it relates to software development tools for code generation.

2. Description of the Related Art

The development of software application code and related application content has long been the province of experts. A systems development expert must analyze the business problem, select the appropriate software tools to solve the business problem and then develop the software code necessary to implement the selected solution. The software created includes executable software programs and related software and materials. Related software may include web page layouts and content while related materials may include documentation or reports.

The field of software engineering developed in an attempt to standardize and simplify the creation of software. Software engineering defines standard processes and procedures that are applied to develop software code. Standardization is intended to promote use of effective solutions and to promote the reuse of previously developed solution components.

Process standardization still leaves the significant task of preparing the software code to implement a solution. Software code may be source code written in one of a number of programming languages such as JAVA®, C++, C#, Pascal or others. In addition, software code may include web pages coded in HTML, database access code in SQL, and written documentation in text form or portable document format (PDF.) Although many of the object oriented languages have stressed code reuse, this has often proved difficult in practice.

Code generation has been attempted using a number of code generators. These code generators use as input a description of the business problem to be solved expressed in some form of modeling language. This language is then interpreted and source code in a selected programming language generated. Many code generators implement what is known as a Model Driven Architecture. A Model Driven Architecture is a structure in which a business model, expressed in a modeling language drives the generation of the resulting software content. One example of a Model Driven Architecture is the Object Management Group (OMG) Model Driven Architecture.

One problem with existing code generators is the inflexibility of the modeling language or the code generation capability. For example, the OMG Model Driven Architecture requires that models be expressed in a well defined notation such as Unified Modeling Language (UML.) UML is a structured language that requires specific content and keywords to describe the business problem. The structure allows code generation to be accomplished by recognizing structural components, and generating software content based on those components. Unfortunately, many business problems are not readily expressed in UML compliant models, eliminating the ability to use generators relying on UML as the model.

Other model architectures provide fixed output generators. That is, the developer has no control over the form or format of the outputs generated base on a model input.

A problem therefore exists in providing a Model Driven approach to software content generation that is flexible in the expression of the business model as well as the content generation options.

SUMMARY OF THE CLAIMED SUBJECT MATTER

The present invention is therefore directed at providing a software content generation system that is flexible in terms of the business model expression, the content generation expression and the transformation of model to application or software content.

The present invention provides a system for building application or software content using an open model driven architecture. The system includes: a processor, a memory and logic for specifying one or more view templates, each view template having static or dynamic content sections or both; specifying a controller element for transforming an application definition presented in a first grammar into output content, the controller specifying one or more transformations that apply the one or more view templates; and creating an application definition using the first grammar, the application definition containing a description of the application logic of the output content desired; and generating the output application content by transforming the application definition as specified by the controller element using the one or more view templates.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures, in which:

DETAILED DESCRIPTION OF THE FIGURES

The preferred embodiment of the present invention implements a model driven architecture that maintains flexibility of expression in each of the descriptive components.

Figure 1:
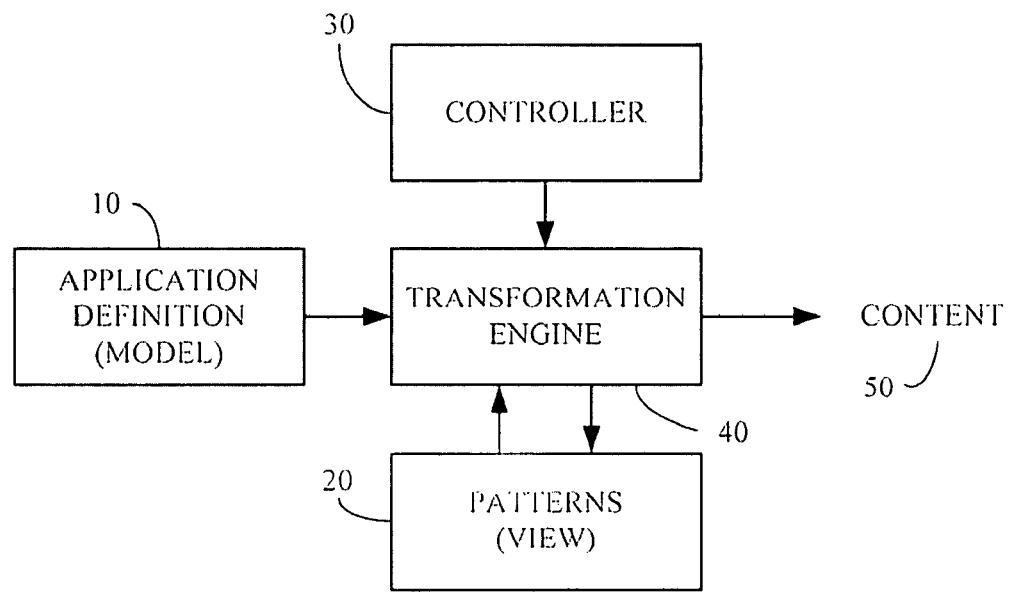
FIG. 1 is a block diagram illustrating the major functions of the preferred embodiment of the present invention.

FIG. 1 illustrates the component pails of an open model driven content generator according to the present invention. An application definition 10 is provided that sets forth a model of the problem to be solved. The model is expressed in a descriptive grammar. For example, the model may be expressed in extensible markup language (XML) which includes tags and descriptors for the model. Other forms of expression can be used however, such as a simple Tag=value specification or through the definition of a set of keywords. An application definition may look similar to the following.

```
<app>
    <xml name="PolicySearch" pkg="com.issw.policy.data" >
        <beans>
            <bean class="Policy" >
                <property name="policyNumber" type="String" />
                <property name="name" type="String" />
                <property name="type" type="String" />
                <property name="car" type="Car" single="false" />
                <property name="address" type="Address" single="true" />
            </bean>
...
            <bean class="PacketSend" >
                <property name="query" type="Policy" single="true" />
            </bean>
            <bean class="PacketReceive" >
                <property name="results" type="Policy" single="false" />
            </bean>
        </beans>
```

```
    </xml>
    <facade name="PolicySearch" pkg="com.issw.policy.service"
        send="PacketSend" receive="PacketReceive" />
</app>
```

Allowing flexibility in expressing the application model reduces the barriers to development for the application developer. The flexible expression structure enables use of the presently claimed invention to develop a large variety of application content. Model descriptions are not limited to a set of problems that can be expressed in a rigid model language.

View templates or content patterns 20 are developed or accessed by the content developer. In an on-going development organization, libraries of view templates will be assembled as a result of development projects. If a template for a particular problem does not exist, the developer creates an appropriate template using exemplar analysis or a similar technique to abstract a view template to solve a particular class of problems. A template may have the form shown in the table below.

```
package <content node="/action/package"/>:
import java.lang.reflect.InvocationTargetException;
import org.eclipse.core.resources.I<content node="/action/target" format="U1"/>;
....
public class <content node="/action/prefix"/>Action implements
IWorkbenchWindowActionDelegate , IRunnableWithProgress {
    private IStructuredSelection tSelection;
    private IWorkbench tWorkbench;
    private I<content node="/action/target" format="U1"/>[ ]
    <content node="/action/target"/>s;
    /**
     * Constructor for <content node="/action/prefix"/>Action
     */
    public <content node="/action/prefix"/>Action( ) {
        super( );
    }
    /**
     * @see IActionDelegate#run(IAction)
     */
    public void run(IAction arg0) {
        // Gather the selected <content node="/action/target"/>s, if any.
        int count = tSelection.size( );
        <content node="/action/target"/>s = new I<content node="/action/target"
format="U1"/>[count];
        Object objs[ ] = tSelection.toArray( );
        for (int index = 0; index < count; index++) {
            <content node="/action/target"/>s[index] = (I<content node="/action/target"
format="U1"/>) objs[index];
        }
        // Perform any prompts or confirmations here before the action
        // takes place
<marker>Insert code here to handle necessary prompts or confirmations</marker>
        try {
            ProgressMonitorDialog dialog= new ProgressMonitorDialog(getShell( ));
            dialog.run(true, true, this);
        } catch (InvocationTargetException ex) {
        } catch (InterruptedException e) {
            // do nothing on cancel
            return;
        }
    }
    /**
     * @see IRunnableWithProgress#run(IProgressMonitor)
     */
    public void run(IProgressMonitor progressMonitor)
        throws InvocationTargetException, InterruptedException {
        // If possible, count the number of discrete steps this invocation
        // of the action will perform and setup the progress monitor...
        String taskDescription = "<content node="/action/task" />";
        int numberOfSteps = tSelection.size( );
        progressMonitor.beginTask(taskDescription,numberOfSteps);
```

```
        for (int index = 0; index < numberOfSteps; index++) {
<marker>Insert the code to perform the action against one of the selected <content
node="/action/target"/>s</marker>
            // Perform the actual action logic here.
            I<content node="/action/target" format="U1"/> <content node="/action/target"/> =
<content node="/action/target"/>s[index];
            // When the action on a selected <content node="/action/target"/> is
            // complete, increment the progress indicator
            progressMonitor.worked(1);
        }
    }
    /**
     * @see IWorkbenchWindowActionDelegate#dispose( )
     */
    public void dispose( ) {
    }
    /**
     * @see IWorkbenchWindowActionDelegate#init(IWorkbenchwindow)
     */
    public void init(IWorkbenchWindow window) {
        tWorkbench= window.getWorkbench( );
    }
    /**
     * Returns the active shell.
     */
    protected Shell getShell( ) {
        return JavaPlugin.getActiveWorkbenchShell( );
    }
    /**
     * @see IActionDelegate#selectionChanged(IAction, ISelection)
     */
    public void selectionChanged(IAction arg0, ISelection selection) {
        if (selection instanceof IStructuredSelection)
            tSelection= (IStructuredSelection)selection;
        else
            tSelection= StructuredSelection.EMPTY;
    }
}
```

The controller description 30 specifies how the application definition 10 will use the patterns 20 to create content output 50. The controller analyzes the application definition and acts based on identified keywords in the grammar. Controller actions can be divided into flow control actions and pattern application actions. These actions comprise a scripting language that is used by the application developer to specify application generation in a flexible manner. The preferred embodiment of the present invention uses a scripting language specifically developed for content generation. A controller according the present invention could, however, use other languages to control code generation. For example, the controller could be expressed in the JAVA® programming language, JAVASCRIPT® scripting language, or Visual Basic language. The scripting language of the present invention permits specification of particular application definition grammars. Since the application grammar is flexible, the controller must similarly be flexible to parse and interpret the application definition. The controller and application definition must therefore be developed together for a particular application to ensure that application definition expressions have the necessary output transformation support.

Flow control actions include conditional actions that apply a particular pattern only if certain conditions exist or repetitive actions such as applying a pattern multiple times. Pattern application actions include generating content output based on variable data specified in the application definition and content output data specified in a pattern. The controller specifies which pattern is to be selected and which variable data is applied to that pattern. The controller specifies how many different output files are to be generated and specifies the structure for the names of those files. An example of a controller element or controller description is shown below.

```
** High-Level Controller
<setAttr node="/action" name="dir"><content node="/action/package"
format="PD"/></setAttr>
<start template="plugin.xml.pat"
resource="%/action(dir)%/%/action/prefix%_plugin.xml" />
<start template="Action.java.pat"
resource="%/action(dir)%/%/action/prefix%Action.java"
/>
```

The content generation process is managed by a transformation engine 40. Transformation engine 40 accesses the controller description 30, application definition 10 and patterns 20. The application definition 10 is read by the transformation engine 40 and parsed to locate keywords and variable data. This parsing occurs using well known techniques of XML analysis or other lexical analysis of a textual file. Keywords are used to locate actions specified in the controller description 30. When a match is found, the matched action is applied. This causes a pattern 20 to be accessed and content to be generated. Content generation involves writing out specified static information and replacing dynamic information with application instance specific information passed to the transformation engine. The result is application content that solves the business problem modeled in the application definition.

The preferred embodiment of the present invention implements an open model driven architecture. The architecture is "open" because of the ability to flexibly specify the application definition (model), the controller, and the view templates. The modeling and generation process is not restricted to a certain class of models or models expressed in a fixed format or language.

The present invention implements a Model-View-Controller (MVC) model of a system. MVC models were originally developed to reduce the complexity of software systems that provide graphical user output using a graphical user interface (GUI.) In such a system the user view of data is kept separate from the rules for accessing the data to be displayed. The application logic for accessing and processing the data is specified in the model. Finally, the controller specifies how data acquired by the model is mapped to the GUI display (the view.)

A system designed using MVC modeling principles provides independence between the model and the view. This reduces implementation complexity because the view designer can concentrate solely on user interface issues while the model designer can concentrate on application logic and data access issues. This independence permits independent design changes to the user interface or the application logic. The user interface could be changed from a web browser display to a workstation client display or a portable device display without modifying the model specification.

In the present invention, the component independence of the MVC model is used to give the designer flexibility in application definition and content creation. For example, a particular application definition can be used to generate content output in different programming languages through the use of different views for each of the languages. Thus, an application definition may specify certain business requirements. The controller will map these to certain patterns. If matched to C language patterns, C program source code can be generated to implement the business solution. Use of a different controller that maps to JAVA® language patterns will result in a JAVA® solution.

The preferred embodiment generates content output. Content output can be any of a plurality of textual data or binary data. This output may be programming code for a particular programming language such as C, JAVA®, or C++. Output also can include descriptive materials such as solution documentation or descriptions. The output may also include web pages or other web components. Binary data may include bitmapped images, graphics or sound output.

Figure 2:
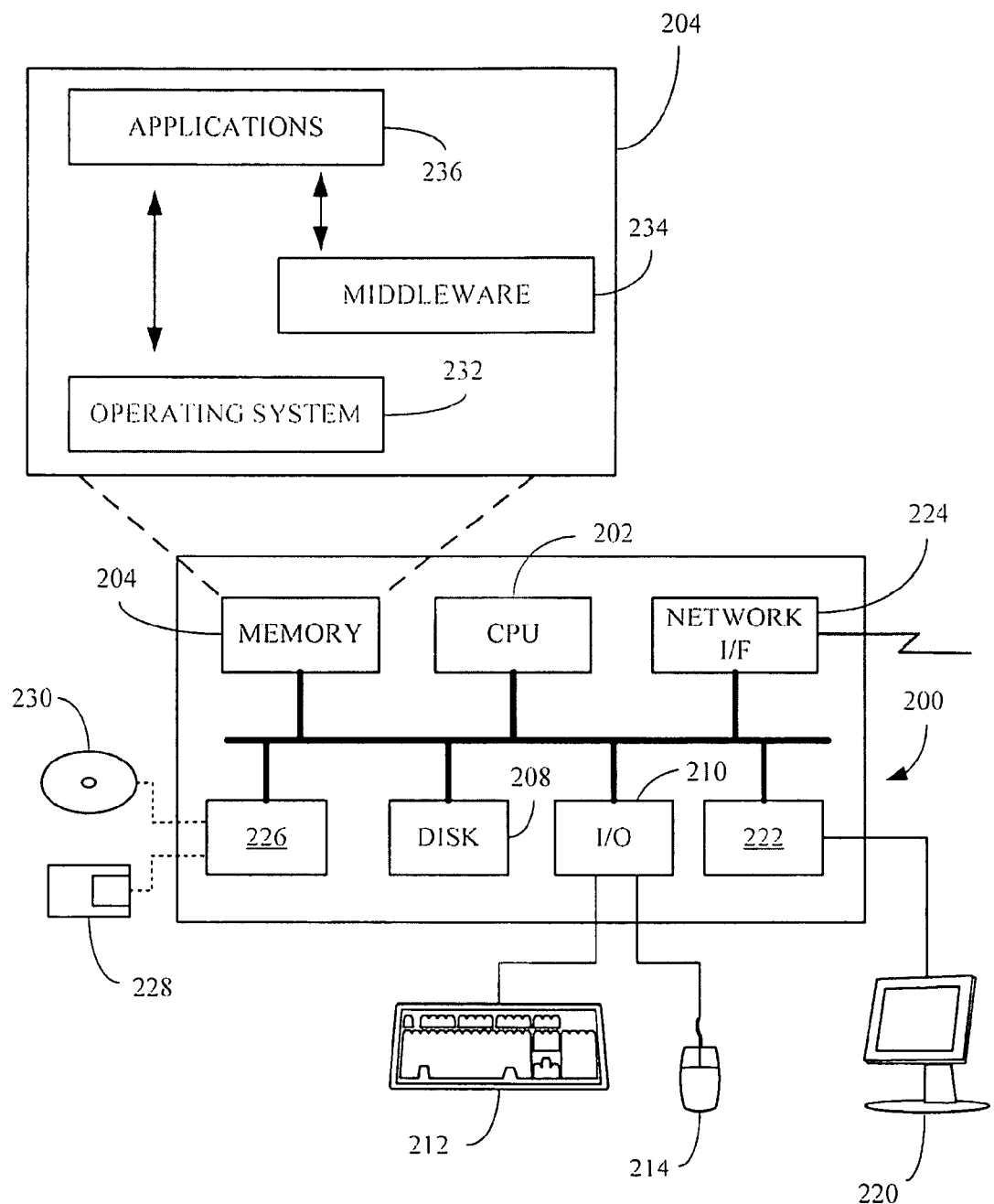
FIG. 2 is a block diagram of a processing system used in the preferred embodiment of the present invention.

The present invention is preferably employed in conjunction with a computer system such as that shown generally in FIG. 2. The computer system 200 has a central processing unit 202 for processing program instructions, a random access memory 204 that stores instructions and data to be processed. Permanent storage 208 is provided in the form of a magnetic disk drive or similar technology. User interface devices are controlled by I/O Controller 210 and include, for example, a keyboard 212 and a pointing device or mouse 214. Information is displayed by video controller 222 on display device 220 which can be a cathode ray lube (CRT) video display, a liquid crystal diode display (LCD) or similar device. The system 200 communicates with other devices or with the internet (not shown) using network interface 224. Removable device controller 226 manages removable storage devices such as floppy diskette 228 or CD-ROM or DVD-ROM 230. The system components in system 200 are linked together and communicate through system bus 206.

Random access memory 204 manages the program instructions and data for the computer system. In a typical computer system, an operating system 232 will manage the processing of tasks on the computer and the interface between particular programs and the hardware subsystems.

Application programs 236 execute on the system to perform particular tasks. The number of application programs running at one lime is limited only by the resources of the system including the operating system limitations. Finally, a variety of middleware 234 may be provided for certain tasks. Middleware 234 are programs that provide generally used facilities used by application programs or directly by users. Middleware can include software such as database management systems such as IBM DB2, MICROSOFT SQLSERVER®, MYSQL®. It may also include web servers and web application servers such as IBM WEBSPHERE® Application Server or MICROSOFT® IIS. Middleware provides generalized services that link together programs and systems to achieve the desired business goals.

Examples of computer systems that can be used in the preferred embodiment include the IBM THINKCENTER® series of personal computers, IBM THINKPAD® notebook computers. IBM XSERIES® workstations, and other machines based on INTEL® or AMD® central processing units (CPUs). These computer systems may operate under an operating system such as MICROSOFT WINDOWS XP®, Linux, or AIX®. The present invention is not limited to a particular hardware or software structure except as claimed.

The invention also may be embodied in a computer program product, such as a diskette, optical ROM, or other recording medium, for use with a data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

The preferred embodiment of the present invention is preferably used in conjunction with an integrated development environment (IDE.) An IDE provides a number of facilities to assist the software developer. The IDE may include project, library and file management features, editors for editing and validating program source code, and compilers for creating compiled executable versions of the desired programs. An example of an IDE is the IBM WEBSPHERE® Application Studio Developer (WASD). Another example is the Eclipse development system managed by the Eclipse Foundation.

Figure 3:
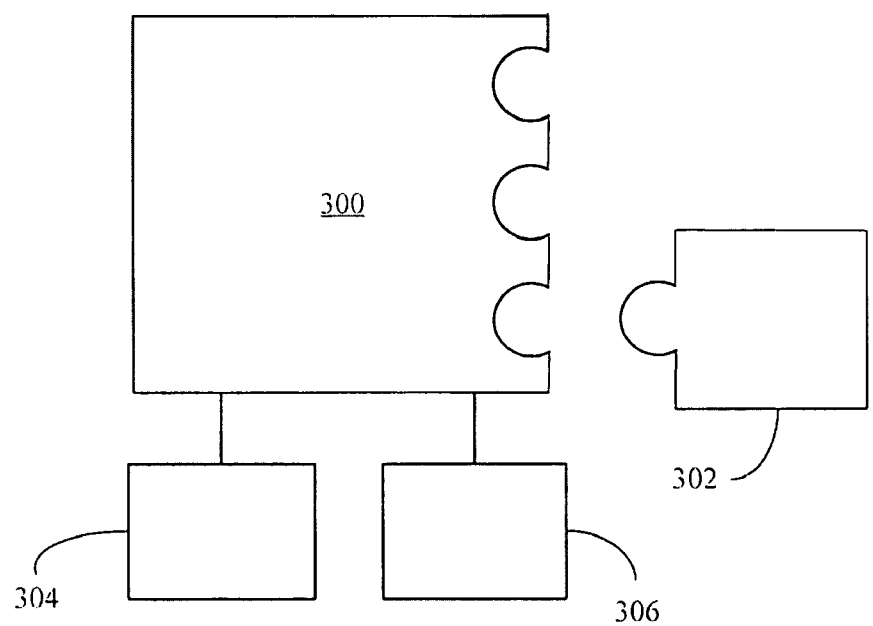
FIG. 3 is a block diagram of an integrated development system according to an embodiment of the present invention.

A system according to the present invention is preferably embodied as an addition to the IDE system. In WASD and Eclipse IDEs such an addition is termed a "plug-in." As shown in FIG. 3, a content generator 302 is added as a plug-in to IDE 300. Operating as a plug-in allows content generator 302 to use the facilities of the IDE to organize the content and to manage content storage in a file system 304. Patterns can be stored in the same file system as the generated content or can be stored in a local or network repository 306.

The IDE also provides editors that can be used to construct application definition files and controller definitions. Editor features such as find or find and replace can also be used by the application developer and the transformation engine. The use of an IDE, however, is not required to practice the present invention because the functions performed by the IDE can be performed directly by the preferred embodiment.

Figure 4:
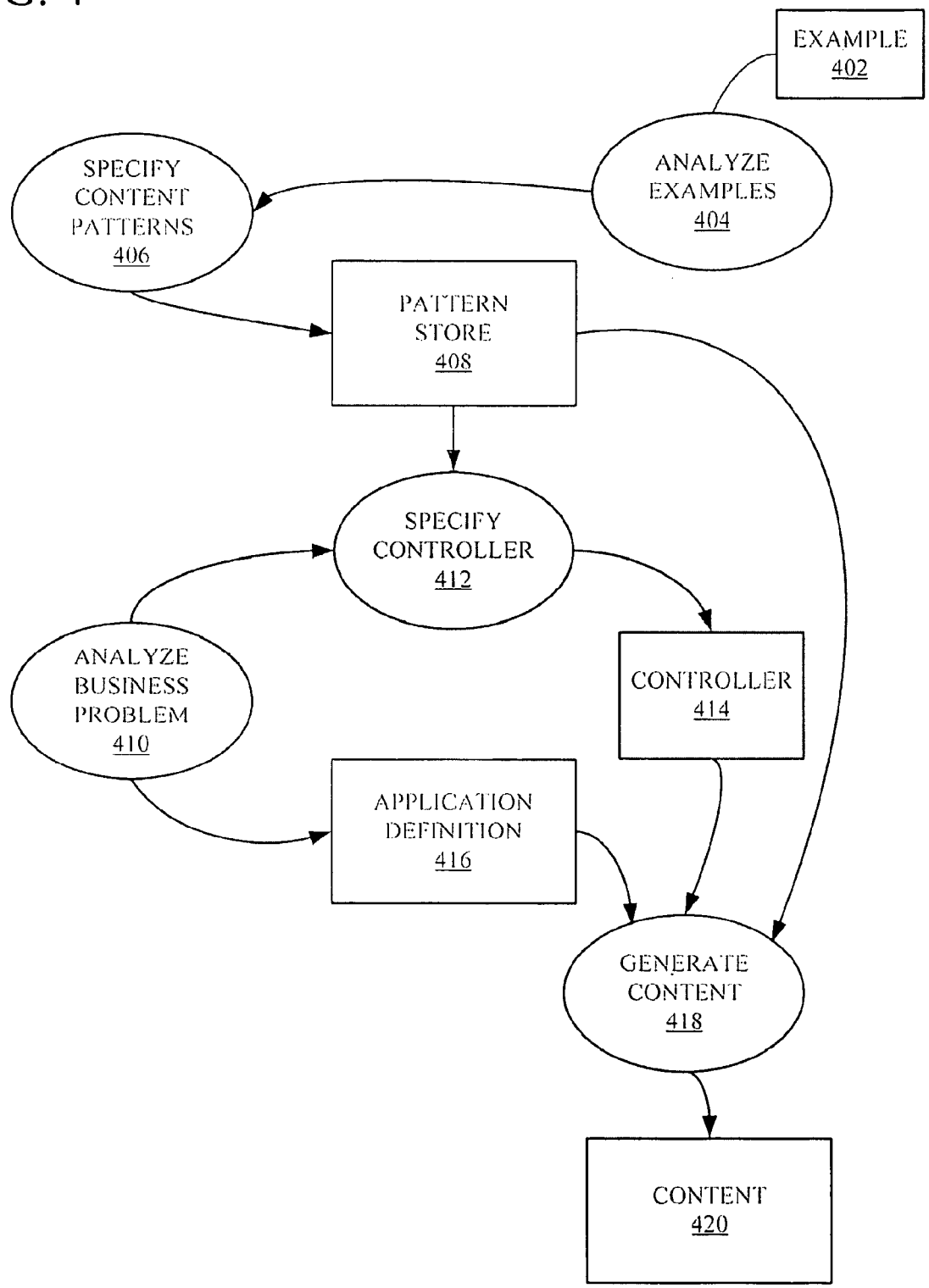
FIG. 4 is a process diagram illustrating the processes and data employed in the preferred embodiment of the present invention.

FIG. 4 illustrates the process flow of the present invention. In many cases content or code patterns 408 are created by analyzing existing content, for example, an existing application program that performs a certain function. The exemplars are analyzed 404. Results of the analysis are used to specify content patterns or view templates in a reusable format 406 and the resulting patterns stored for future use in pattern store 408.

A view template includes static and dynamic content. For example, if programming language code is being generated, the template may include static program language keywords. Particular program variables will be represented as dynamic code. The template is used to generate code by replacing the dynamic code with information extracted from the application definition as specified by the controller definition. The controller definition provides the mapping between information provided in the application definition 416 and the dynamic portions of the output. Dynamic portions may represent "variables" in a programming language, but may also represent other changeable information. Thus, the chapter titles in a document could be represented as having static and dynamic parts. Program code may include dynamic names for classes and methods as well. A standardized naming convention is used in one embodiment to control the types and formats of names used throughout the resulting system.

The analysis of the business problem 410 results in an application definition 416. The term "business problem" is used to describe the problem scope the content is desired to solve. It need not be "business" related and can include analysis of games, non-profit organization issues, entertainment or recreational problems, in each case the problem is analyzed and the results expressed as an application definition. The analytical results are also used to specify the controller 412. The controller definition is developed based on the application analysis and the available patterns 408. The controller definition is stored as a controller definition 414.

Finally, content is generated 418 using a transformation engine. Content generation is performed by accessing the application definition 416 under the control of controller 414. The generator applies the application definition variables to the patterns 408 to create generated content 420.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

We claim:

1. A system, comprising:
a storage medium for storing one or more view templates, each view template having static or dynamic content sections or both, wherein at least one of the one or more view templates has both static and dynamic content sections;
a storage medium for storing an application definition expressed in a first grammar and a controller mapping the first grammar to application content output; and
a processor for generating application content by transforming the application definition under the control of the controller by accessing the one or more view templates and generating static content and application specific content by replacing dynamic content with application definition content;
wherein the generating includes replacing dynamic content sections in said one or more view templates with information derived from said application definition;
wherein the dynamic content portion employs a standardized naming convention; and
wherein the controller maps the application definition to the view template based on matching names for dynamic content.

2. A computer program product, comprising:
a computer readable recordable medium;
program logic, stored on the computer readable recordable medium for execution on a processor, for:
specifying one or more view templates, each view template having static and dynamic content sections, wherein at least one of the one or more view templates has both static and dynamic content sections;
specifying a controller element for transforming an application definition presented in a first grammar into application content, said controller specifying one or more transformations that apply said one or more view templates;
creating an application definition using said first grammar, said application definition containing a description of the application logic of the output content desired; and
generating said application content by transforming said application definition as specified by said controller element using said one or more view templates;
wherein the generating includes replacing dynamic content sections in said one or more view templates with information derived from said application definition;
wherein the dynamic content portion employs a standardized naming convention; and
wherein the controller maps the application definition to the view template based on matching names for dynamic content.

* * * * *